(12) United States Patent
Pino (10) Patent No.: US 8,275,728 B2
(45) Date of Patent: Sep. 25, 2012

(54) NEUROMORPHIC COMPUTER

(75) Inventor: Robinson E. Pino, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 516 days.

(21) Appl. No.: 12/590,306

(22) Filed: Nov. 5, 2009

(65) Prior Publication Data

US 2011/0106742 A1    May 5, 2011

(51) Int. Cl.
  *G06F 15/18* (2006.01)
  *G06J 1/00* (2006.01)
  *G06N 3/00* (2006.01)
(52) U.S. Cl. .................. 706/33; 706/15; 706/6
(58) Field of Classification Search .............. None
  See application file for complete search history.

(56) References Cited

U.S. PATENT DOCUMENTS

| | | | | |
|---|---|---|---|---|
| 4,950,917 A | * | 8/1990 | Holler et al. | 706/38 |
| 5,055,897 A | * | 10/1991 | Canepa et al. | 257/319 |
| 5,274,746 A | * | 12/1993 | Mashiko | 706/34 |
| 5,394,511 A | * | 2/1995 | Mashiko | 706/33 |
| 6,507,828 B1 | * | 1/2003 | Leonard et al. | 706/33 |
| 6,768,340 B2 | * | 7/2004 | Lee | 326/83 |
| 2005/0137993 A1 | * | 6/2005 | Poon | 706/26 |
| 2009/0292661 A1 | * | 11/2009 | Haas | 706/33 |
| 2010/0277232 A1 | * | 11/2010 | Snider | 327/565 |
| 2011/0004579 A1 | * | 1/2011 | Snider | 706/25 |
| 2011/0119214 A1 | * | 5/2011 | Breitwisch et al. | 706/33 |
| 2011/0137843 A1 | * | 6/2011 | Poon et al. | 706/33 |
| 2011/0240941 A1 | * | 10/2011 | Pickett et al. | 257/1 |

OTHER PUBLICATIONS

Borghetti et al. A hybrid nanomemristor/transistor logic circuit capable of self-programming, PNAS, Feb. 2009, pp. 1699-1703.*
Song et al. "A puse-based neural network hardware implementation based on the controlled conductance by MOSFET circuit", International conference on neural networks, 2003, pp. 2793-2799.*
Snider et al. "Summary of presentation of cortical computing with memristice nanodevices", 2008, 18 pages.*
Gurney, "An introduction to neural networks", UCL Press Limited, 1999, pp. 1-4 and 13-15.*
Hawkins et al. "MOSFET Transistors", Introduction to Digital Electronics, 2005, pp. 3-1 to 3-35.*

* cited by examiner

*Primary Examiner* — Omar Fernandez Rivas
(74) *Attorney, Agent, or Firm* — Joseph A. Mancini (57) ABSTRACT

A neuromorphic computing device utilizing electronics to perform the function of neurons and synaptic connections. The invention provides variable resistance circuits to represent interconnection strength between neurons and a positive and negative output circuit to represent excitatory and inhibitory responses, respectively. The invention provides advantages over software-based neuromorphic computing methods.

1 Claim, 10 Drawing Sheets

NEUROMORPHIC COMPUTER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of computer architectures modeled on the function of the brain. More specifically, the present invention relates to a computer architecture using modem electronics to perform the function of neurons and synaptic connections.

The amazing computing power of the brain originates thanks to its highly parallelized interconnectivity amongst neurons through synaptic connections. The synaptic connection plays an important role in brain activity as these connections can be strengthened or weakened as the brain learns and knowledge is stored within the system [2]: Neuron behavior has been characterized as an adding system that provides an output based on the sum of all inputs, or synapse outputs, and its connectivity to other neurons [1]. In addition, the amount of information or knowledge a neuromorphic computer can retain depends on the number neurons and synaptic connections within the system. For example, the brain of an ant is said to contain approximately 300,000 neurons [3].

The natural ability of the brain to perform a high number of complex functions in parallel that to date are unmatched by the fastest most powerful supercomputers represents a great technological engineering challenge. Neuromorphic computers promise to provide artificial machines the ability to perform complex functions by mimicking the brain's engineering. Software based implementations of neuromorphic computing have demonstrated the feasibility of mimicking brain functionality [1]. However, software based implementations of neuromorphic computing require high performance computers and super computers that in turn make usage of such applications in everyday life impractical specially within mobile and/or low cost systems.

What is lacking, therefore, is the development of hardware based neuromorphic computer that will enable a technological breakthrough with the implementation of brain functionality within systems that are built based on the engineering principles of the brain. Such a hardware based neuromorphic computer would require a neuromorphic hardware architecture that mimics the brain's synaptic and neuron functionality employing electronic devices to represent synaptic and neuron characteristic behavior. Given the large number of neurons and synaptic connections (approximately 1,000 synaptic connections per neuron) required to design systems capable of mimicking practical brain functionality such as image recognition, it is important for the electronic devices to be small in order to be fabricated within a small physical area as computer microprocessors are fabricated today.

OBJECTS AND SUMMARY OF THE INVENTION

The present invention provides an apparatus to perform human brain-like computing functions.

It is an object of the present invention to provide an apparatus that overcomes the limitations of software-based methods to perform human brain-like computing functions.

It is another object of the present invention, then, to provide an electronic means to perform excitatory and inhibitory responses.

It is another object of the present invention to provide an apparatus that performs the functions of neurons and synaptic connections through electronic means.

It is a further object of the present invention to provide an electronic means for performing the functions of neurons and synaptic connections which is amenable to high density fabrication.

Briefly stated, the present invention provides an apparatus for human brain-like (i.e., neuromorphic) computing utilizing electronics to perform the function of neurons and synaptic connections. The invention provides variable resistance circuits to represent interconnection strength between neurons and a positive and negative output circuit to represent excitatory and inhibitory responses, respectively. This approach has definite advantages over software-based neuromorphic computing methods.

The above, and other objects, features and advantages of the present invention will become apparent from the following description read in conjunction with the accompanying drawings, in which like reference numerals designate the same elements.

REFERENCES

[1] J. Lawrence and S. Luedeking, "Introduction to Neural Networks," California Scientific software, Grass Valley, Calif., 1991.
[2] G. Bi and M. Poo, "Synapti Modification by Correlated Activity: Hebb's Postulate Revisited," *Annual Review of Neuroscience*, 24 (2001) 139-66
[3] Science blogging the intersection between biology and technology, 2007.
[4] L. O. Chua, "Memristor—The Missing Circuit Element," *IEEE Transactions on Circuits Theory*, 18 (1971) 507-519.
[5] Wikipedia, the free encyclopedia, "MOSFET,", 2009.

DETAILED DESCRIPTION OF THE PREFERRED EMBODIMENT

The basic building block of the neuromorphic computer is the synapse circuit. A synapse circuit requires (1.) a variable resistance circuit to represent the interconnection strength between neurons and (2.) a positive/negative output circuit to represent excitatory and inhibitory responses.

Variable Resistor Circuit

In the present invention, a variable resistor is obtained by biasing an n-channel field effect transistor (nfet) device in such a way that it operates within the linear region. This functionality can also be achieved with a memristor [4] device. In the linear or Ohmic mode region, the drain source current of the nfet behavior can be modeled as [5]:

$$I_{DS} = \mu_n C_{ox} \frac{W}{L}\left((V_{GS} - V_{th})V_{DS} - \frac{V_{DS}^2}{2}\right) \quad (1)$$

where IDS is the drain to source current, $\mu_n$ is the electron mobility, Cox is the gate oxide capacitance, W and L are the width length of the device, Vth is the nfet's threshold voltage, and VGS and VDS are the gate-to-source and drain-to-source bias voltages. For the nfet transistor to operate within the linear region (cut-off or sub-threshold or weak inversion mode), the gate biasing potential must be less that the threshold voltage, VGS<Vth. From Eqn. (1) the channel variable resistance, R, or conductance, G is defined as:

$$G(V_{GS}, V_{th}, V_{DS}) = \frac{1}{R(V_{GS}, V_{th}, V_{DS})} = \mu_n C_{ox} \frac{W}{L}\left(V_{GS} - V_{th} - \frac{V_{DS}}{2}\right) \quad (2)$$

therefore, Eqn. (1) can be rewritten as:

$$I_D = G(V_{GS}, V_{th}, V_{DS}) * V_{DS} = \frac{1}{R(V_{GS}, V_{th}, V_{DS})} * V_{DS} \quad (3)$$

Figure 1:
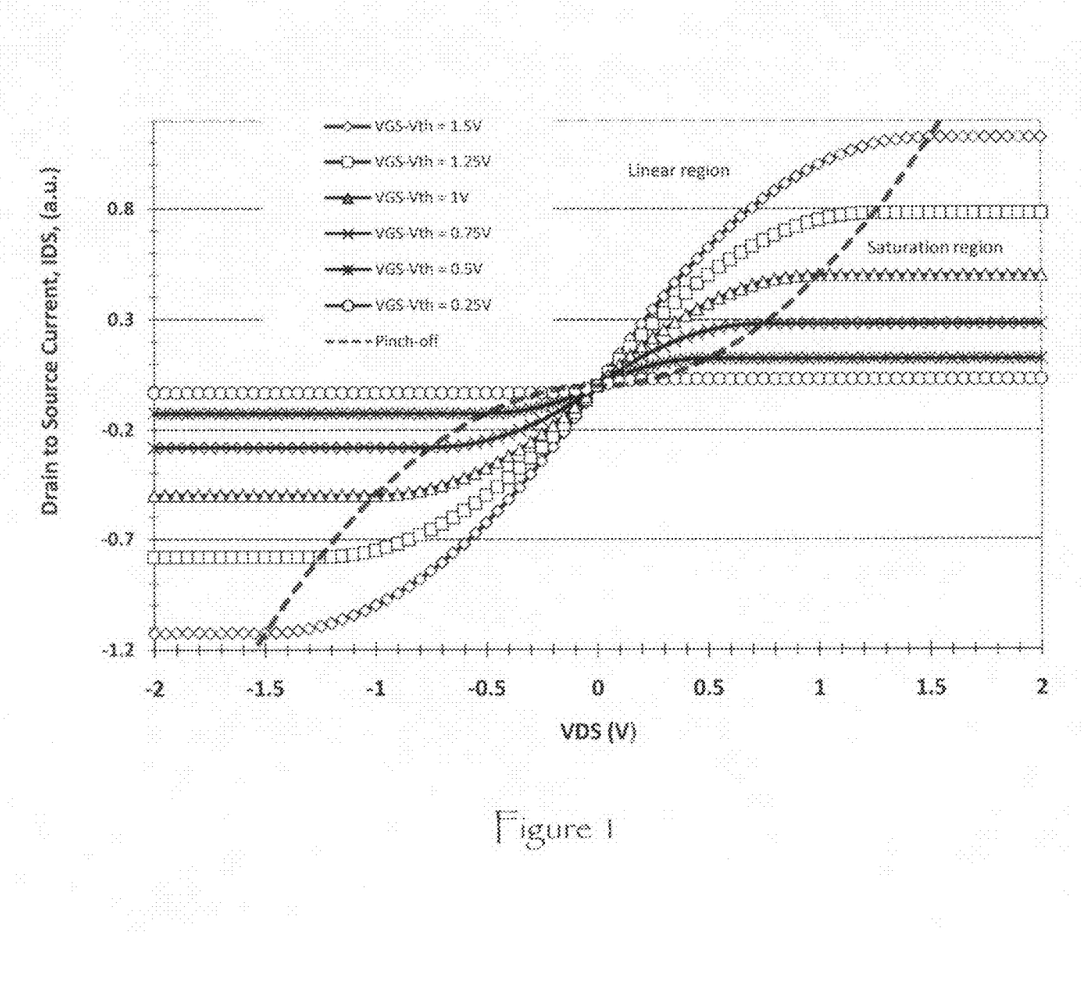
FIG. 1 depicts the I-V electrical characterization results described by Eqn (1), specifically, nfet drain-to-source current (Ids) vs. drain-to-source voltage (Vds) for several values of Vgs–Vth; the boundary between linear (Ohmic) and saturation (active) modes is indicated by the upward curving parabola.

FIG. 1 displays the I-V electrical characterization results described by Eqn (1) for a symmetric nfet device. Nfet drain-to-source current (Ids) vs. drain-to-source voltage (Vds) for several values of Vgs–Vth is depicted. The boundary between linear (Ohmic) and saturation (active) modes is indicated by the upward curving parabola. Still referring to FIG. 1, one can observe that the linear region, bounded by the pinch-off dashed line, where VGS>Vth and VDS<(VGS–Vth), provides a variable resistive behavior that is a function of gate, drain, and source node and threshold voltage biases as described by Eqn (2). From the electrical characterization results displayed in FIG. 1, it is possible to calculate the conductance G, which is by definition the first derivative of the drain-to-source current with respect to the drain-to-source voltage and the results are shown in FIG. 2.

Figure 2:
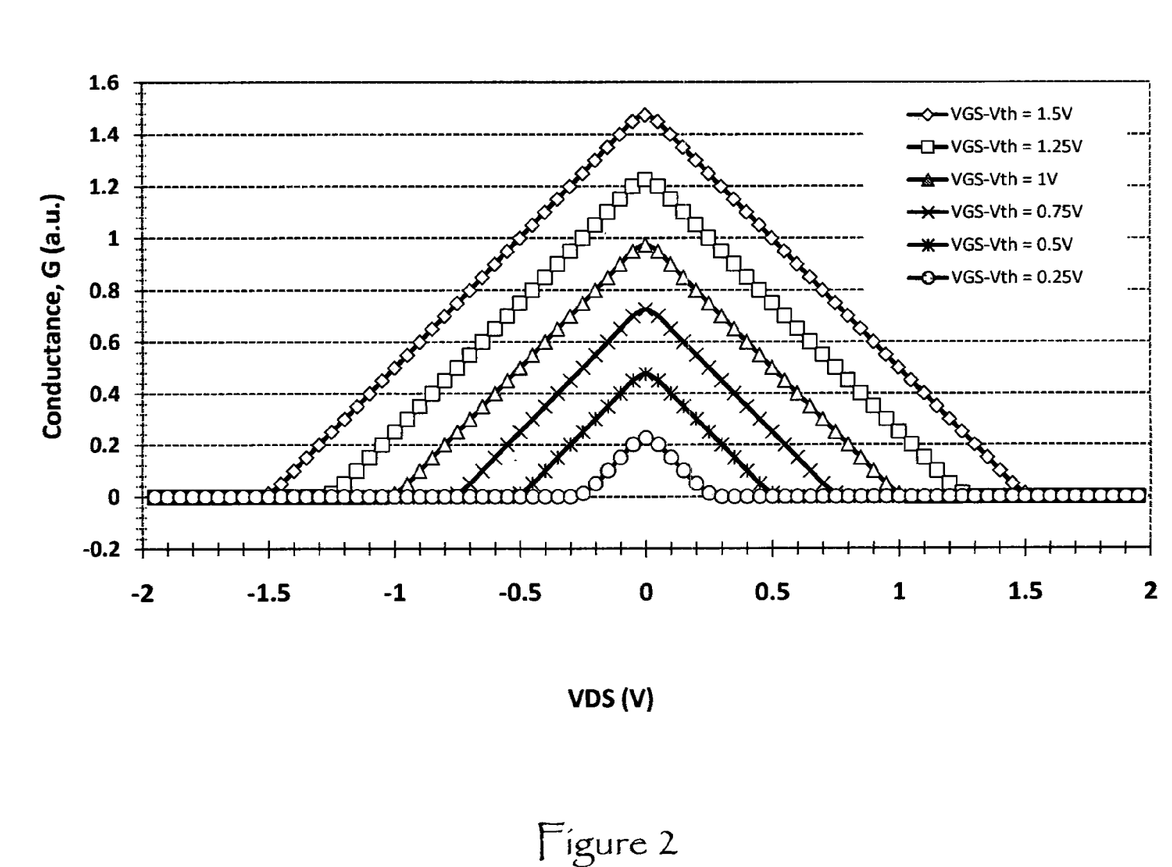
FIG. 2 depicts the nfet channel conductance for the same biasing voltage conditions indicated in FIG. 1.

Referring to FIG. 2 depicts the nfet channel conductance for the same biasing voltage conditions outlined in FIG. 1. From the figure, we can observe that the nfet device displays a range of conductance that is proportional to the gate, drain, and source potential biases.

Figure 3:
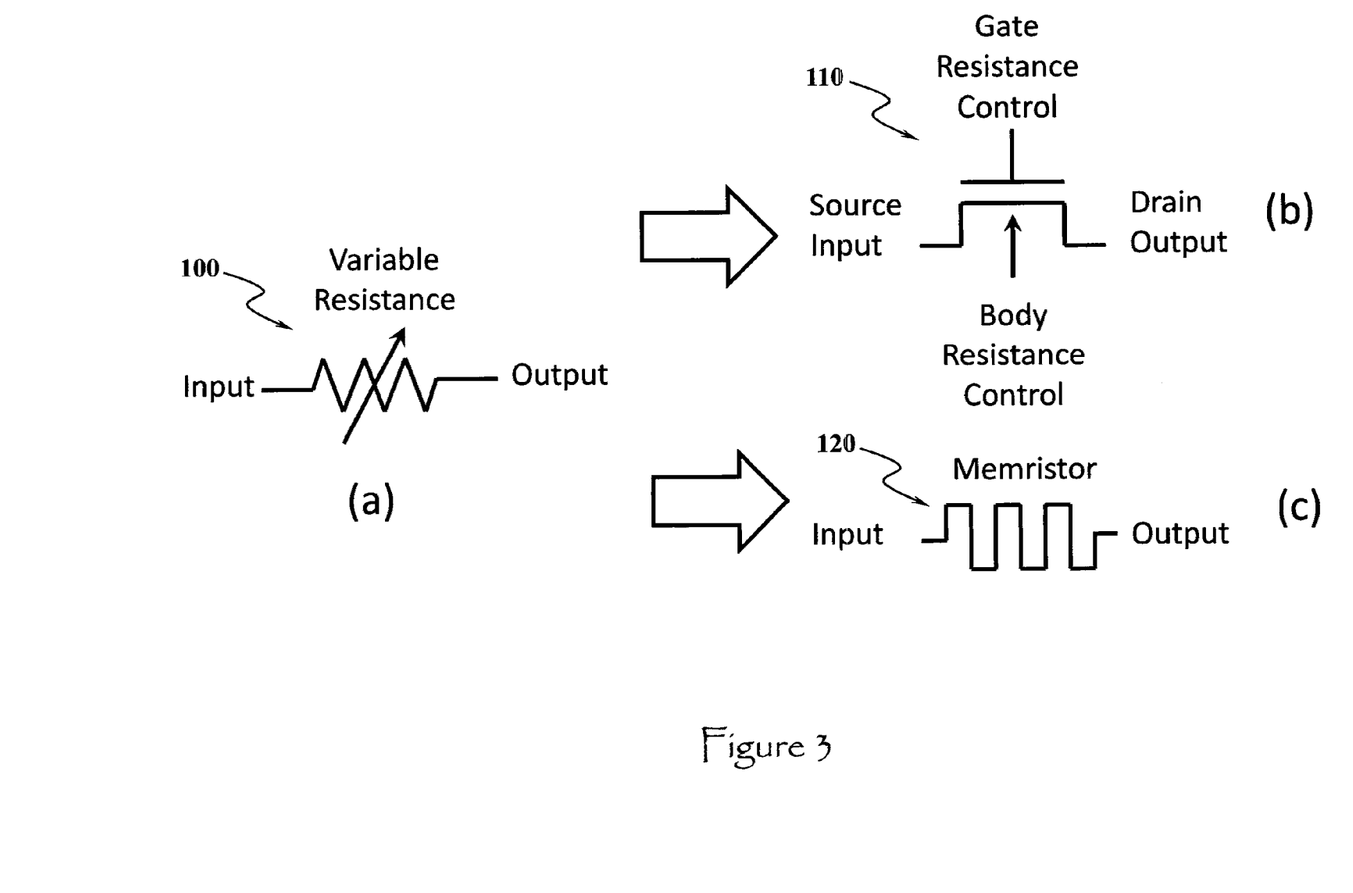
FIG. 3 depicts variable resistive equivalent circuit element that can be achieved with a MOSFET or memristor devices.

Referring to FIG. 3 depicts how the variable resistive equivalent circuit element 100 can be achieved with a MOSFET 110 or memristor 120 devices. FIG. 3 also depicts the electrical equivalent diagram for a MOSFET device 110 operated within the linear region and a memristor device 120 to the electrical symbol of a variable resistor 100. This variable conductance, or its inverse the resistance, can be used to control the connection strength between synapses and neuron circuitry.

Positive/Negative Output Potential Circuit Element

Figure 4:
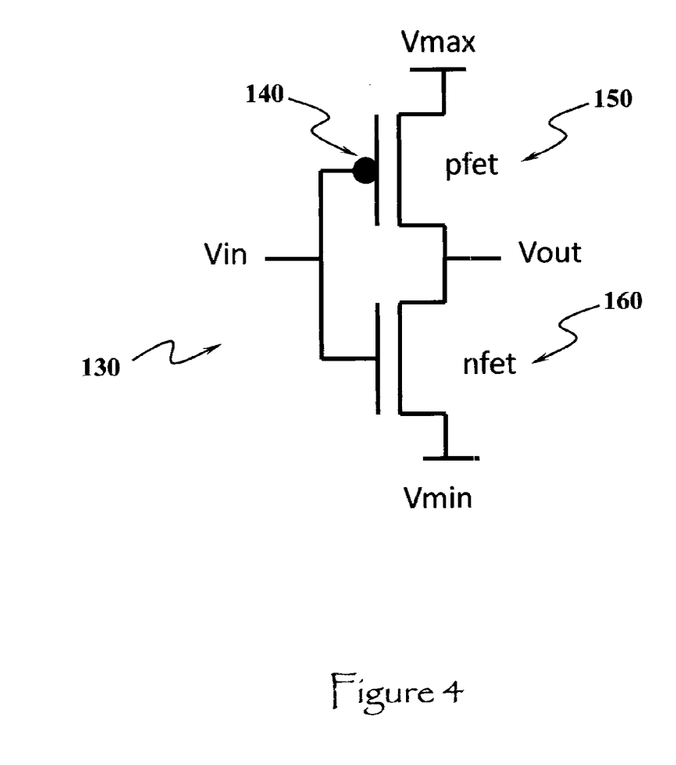
FIG. 4 depicts a CMOS inverter.

Referring to FIG. 4, the present invention re-create the positive and negative (excitatory and inhibitory) potential outputs of a synaptic system by employing a common CMOS inverter circuit 130 operating along its transition region. A pfet device 150 (distinguished by the black notch on its gate 140) is connected to an nfet 160 device in series. Both devices receive the same input, and based on the input potential, the inverter circuit 130 will output either Vmax or Vmin. For example, if the input potential is 0 volts, the nfet device 160 will be in the off state meaning the input potential is below its threshold voltage and no conducting channel is formed under the gate. On the other hand, at 0 volts, the pfet device 150 is switched on given that its threshold potential is negative. Therefore, for a zero input voltage the output of the inverter 130 is Vmax as Vout will be shorted to Vmax through the channel under the gate 140 for the pfet device 150.

The present invention needs to operate the inverter circuit 130 along its transition region to achieve positive (Vmax) and negative (Vmin) potential outputs that will resemble post-synaptic behavior. Since the inverter circuit 130 of FIG. 4, works in saturation mode, meaning that Vmax and Vmin (VDS) are both greater in magnitude than (VGS–Vth), transistor current saturation equations describe its transition characteristics. For an nfet device, ignoring channel length modulation, the drain current is modeled as for the nfet as [4] (for the pfet reverse current flow direction):

$$I_{DS} = \frac{\mu_n C_{ox}}{2}\frac{W}{L}(V_{GS} - V_{th})^2 \quad (4)$$

Figure 5:
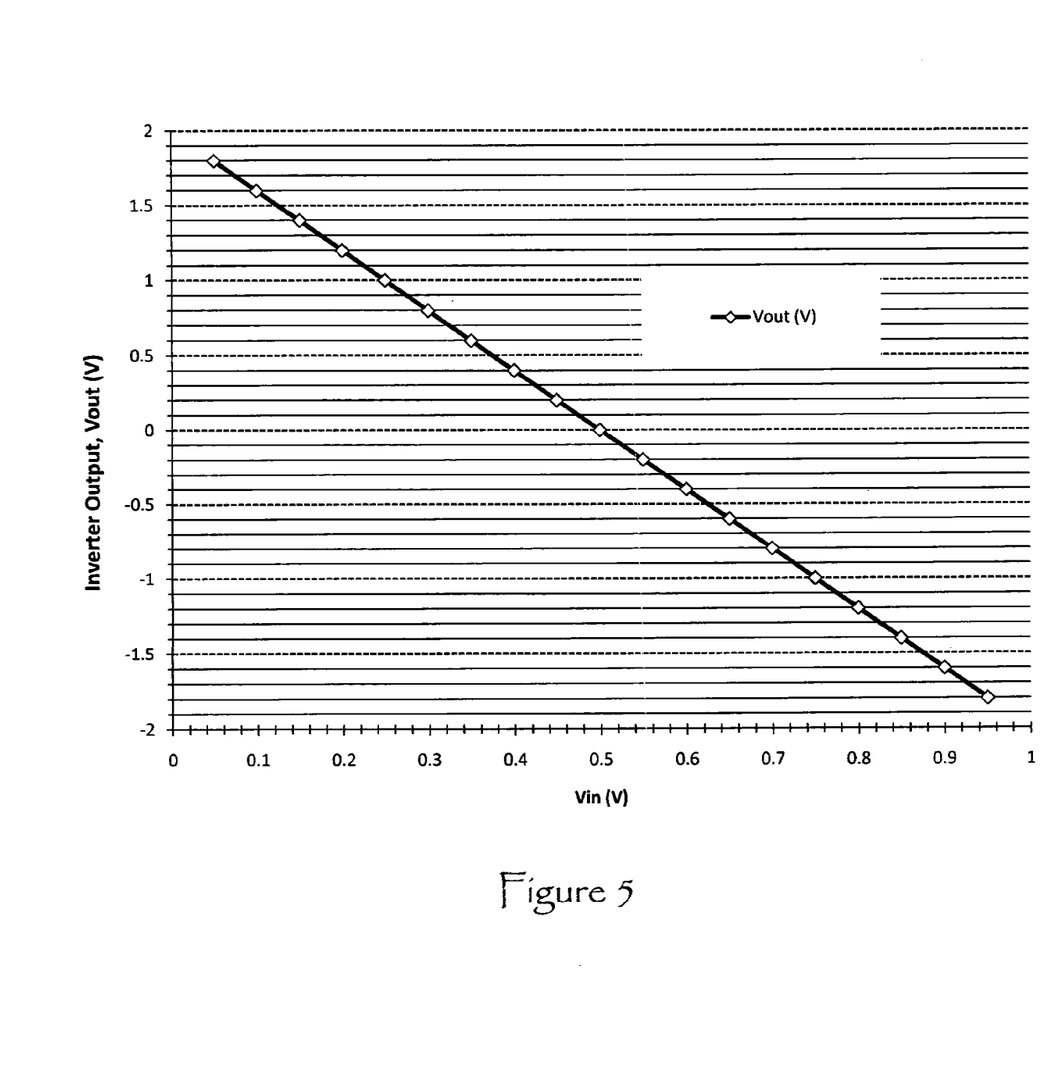
FIG. 5 depicts a CMOS inverter output voltage (Vout) versus input signal (Vin) where Vth=O and –1V for the nfet and pfet devices and Vmax=2 V and Vmin=–2 V respectively.

Referring to FIG. 5, depicts a CMOS inverter output voltage (Vout) versus input signal (V in) where Vth=O and –1V for the nfet and pfet devices and Vmax=2 V and Vmin=–2 V respectively. For nfet and pfet devices with 0 and –1 V threshold voltages, the CMOS inverter transition region can be simulated using Equation (4), and the simulation results are displayed. Still referring to FIG. 5, one can observe that it is possible to obtain tunable range of output potentials (positive or negative) as function of a single input bias potential. This particular functionality is important in the present invention because its synaptic system is capable of both positive and negative output potentials. The simulation results displayed in FIG. 5 can be used to create a compact linear model that is used to describe the inverting circuit as:

$$V_{OUT} = (-4)*V_{in} + 2V \quad (5)$$

where Vin is the input to the inverting circuit.

Synaptic System

Figure 6:
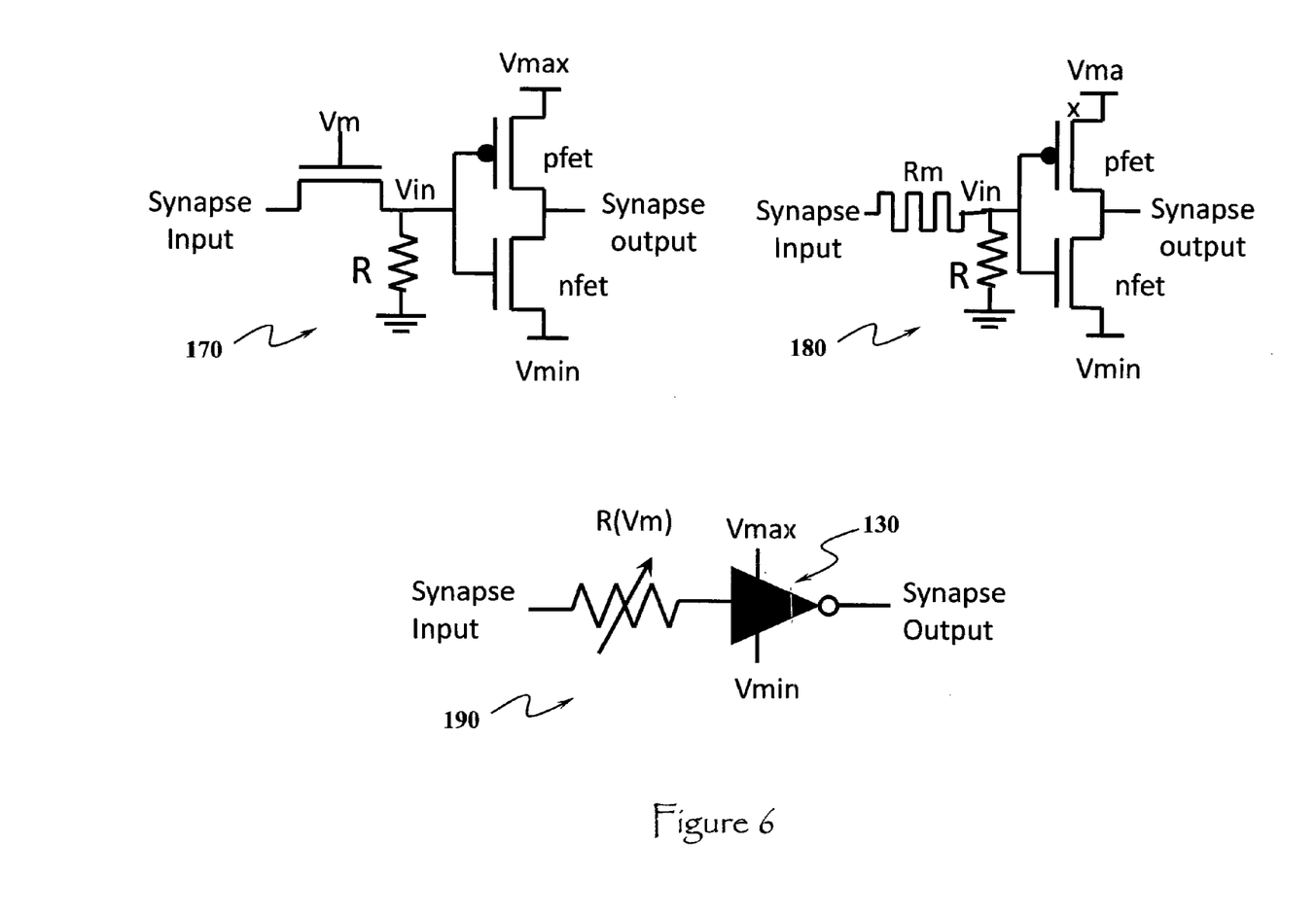
FIG. 6 depicts a synaptic system employing a MOSFET (a), memristor (b), and the simplified synaptic circuit representation (c).

In the present invention the synaptic system employs the variable resistor and inverter circuit elements described previously. Referring to FIG. 6 describes the complete synaptic system by way of a circuit representation of a synapse using a transistor 170 and alternately a memristor 180. The simplified circuit element form 180 will be employed when designing the neuromorphic network. From FIG. 6, one can observe that the output of the synaptic system is a function of the Vm potential that will either strengthen, weaken, or completely cut-off the connection between the synapse input and the CMOS inverting circuit 130 (see also FIG. 4, 130) operating within its transition bias point range.

The synapse output (SO) can be modeled as:

$$SO(SI, V_m) = f[I(V_m)*R] \quad (6)$$

Where f represents the transfer function of the CMOS inverter 130, i.e. described in Eqn. (5), I(Vm) is current across the transistor channel (or transistor channel operating in the linear region as a variable resistance), and R is a resistor used to reset the synapse. For example, for synaptic inputs between 0 and 1 V, as shown in FIG. 5, Eqn. (6) will range from 2 to −2 V approximately as a function of the resistive element R(Vm). Equations (5) and (6) can be combined to obtain:

$$SO(SI, V_m) = -4 * [I(V_m)*R] + 2V$$

$$I(V_m) = \mu_n C_{ox} \frac{W}{L}\left((V_m - V_{th})SI - \frac{SI}{2}\right)^2$$

$$SO(SI, V_m) = -4 * \left[\mu_n C_{ox} \frac{W}{L}\left((V_m - V_{th})SI - \frac{SI^2}{2}\right)R\right] + 2V$$

where SI is the input to the synapse in voltage units, $V_m$ is a biasing weight voltage of the transistor, W is the width of the gate of the transistor, L is the length of the gate of the transistor, $C_{ox}$ is the gate oxide capacitance of the transistor, R is the value of a biasing resistor used to control the potential output of the synapse, $V_{th}$ is the threshold voltage of the transistor, and $\mu_n$ is electron mobility of the transistor.

Adding Node and Single Transistor Adding Neuron Neuromorphic Architecture.

Figure 7:
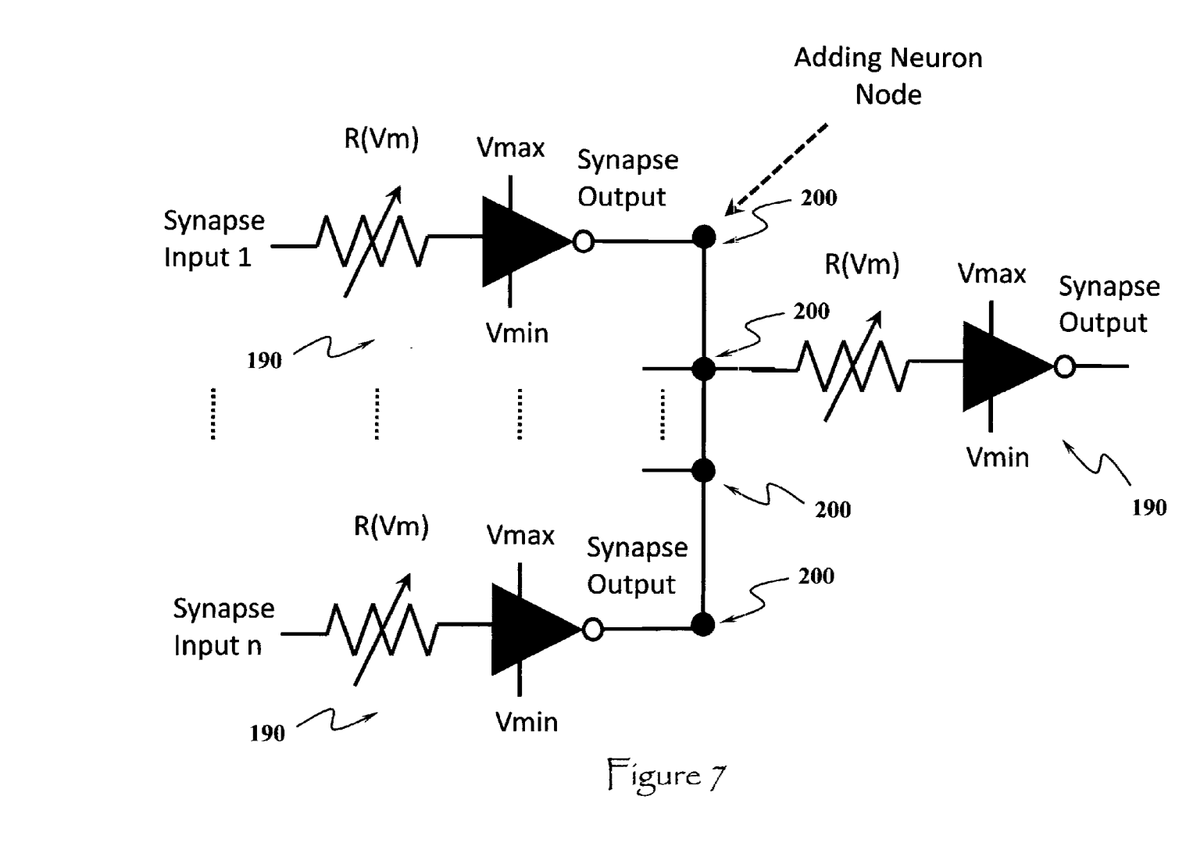
FIG. 7 depicts the convergence of multiple synaptic outputs at the floating adding node and their combined response is fed to the next neuron synaptic layer of the neuromorphic computing architecture.
Figure 8:
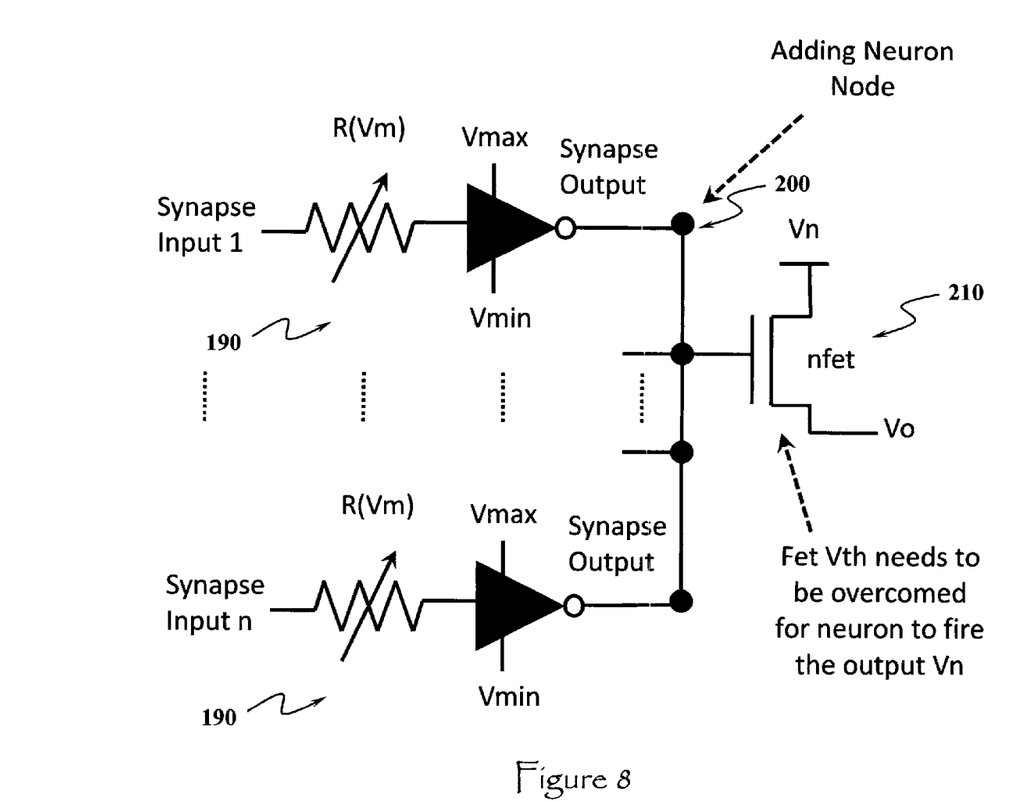
FIG. 8 depicts how the convergence of multiple synaptic outputs at the adding neuron where their relative contribution (the adding of all post-synaptic output potentials) will cause the single MOSFET neuron to fire as long at the overall synaptic contribution is above its threshold potential, and how the neuron output Vo will be fed to the next synaptic layer of the neuromorphic computing architecture.

Referring to FIG. 7 and FIG. 8 concurrently, the implementation of the neuron functionality in the present invention is performed with an adding node 200 and/or a single transistor. FIG. 7 depicts multiple synaptic outputs converging at multiple floating adding nodes 200 and their combined response is fed to the next neuron synaptic layer of the neuromorphic computing architecture. The adding node 200 is the physical connection where all post-synaptic outputs converge. As the synaptic outputs converge, they will increase or decrease the potential at the floating neuron adding node 200. As depicted in FIG. 8, multiple synaptic outputs converge at the adding neuron 200 where their relative contribution (the adding of all post-synaptic output potentials) will cause the single MOSFET neuron 210 to fire as long at the overall synaptic contribution is above its threshold potential. The neuron output Vo will be fed to the next synaptic layer of the neuromorphic computing architecture. Thus, the resulting added potential will become the input to the following synaptic layer. In addition, if the neuron adding node where connected to the gate of an nfet transistor, and if the total combined potential at the adding node is greater than the threshold voltage, Vth, of the MOSFET transistor, thy output of the neuron will be Vo=Vn. Otherwise, the neuron won't have an output (the neuron won't fire) as shown in FIG. 8.

Figure 9:
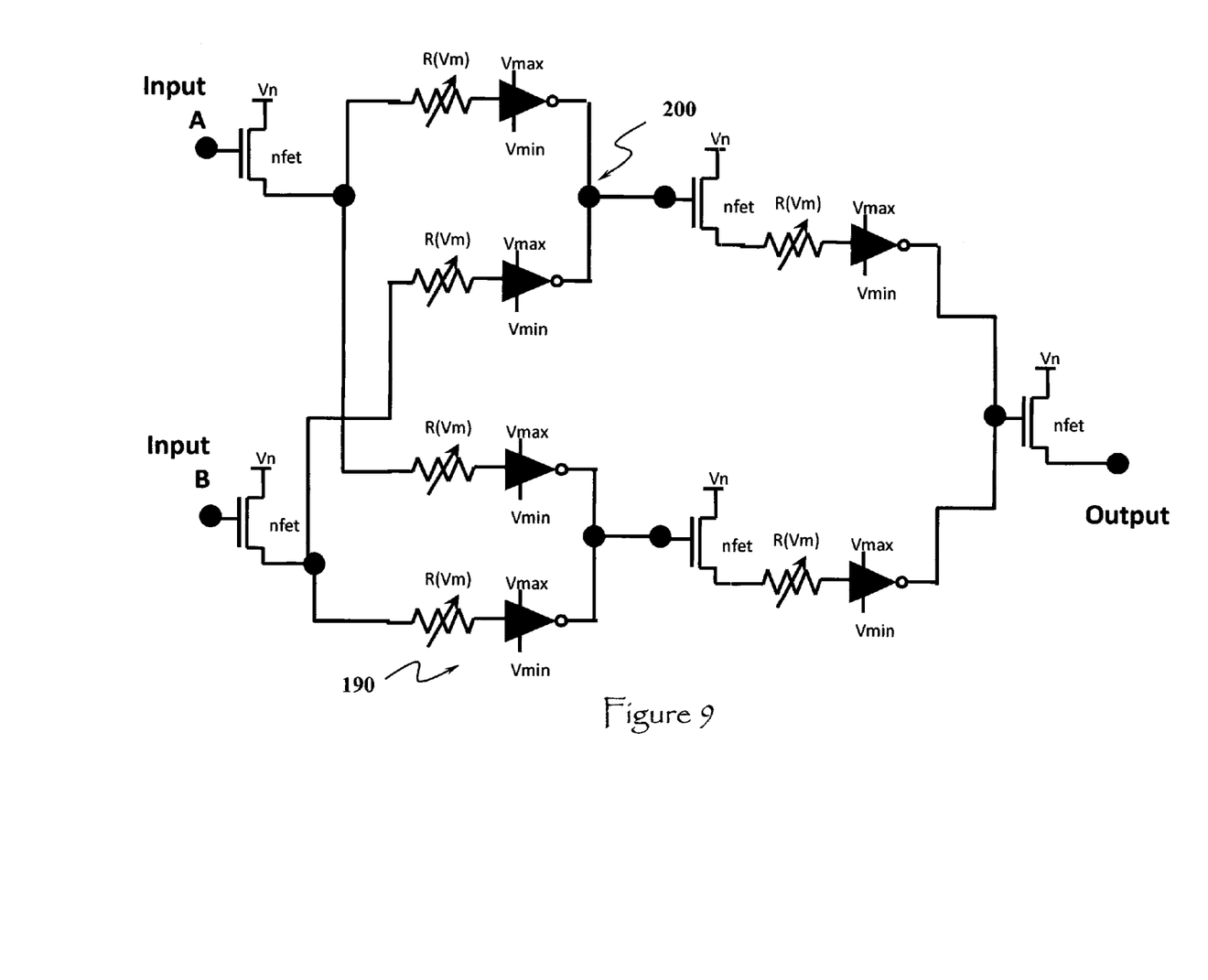
FIG. 9 depicts a neuromorphic architecture implementation with floating adding neurons.
Figure 10:
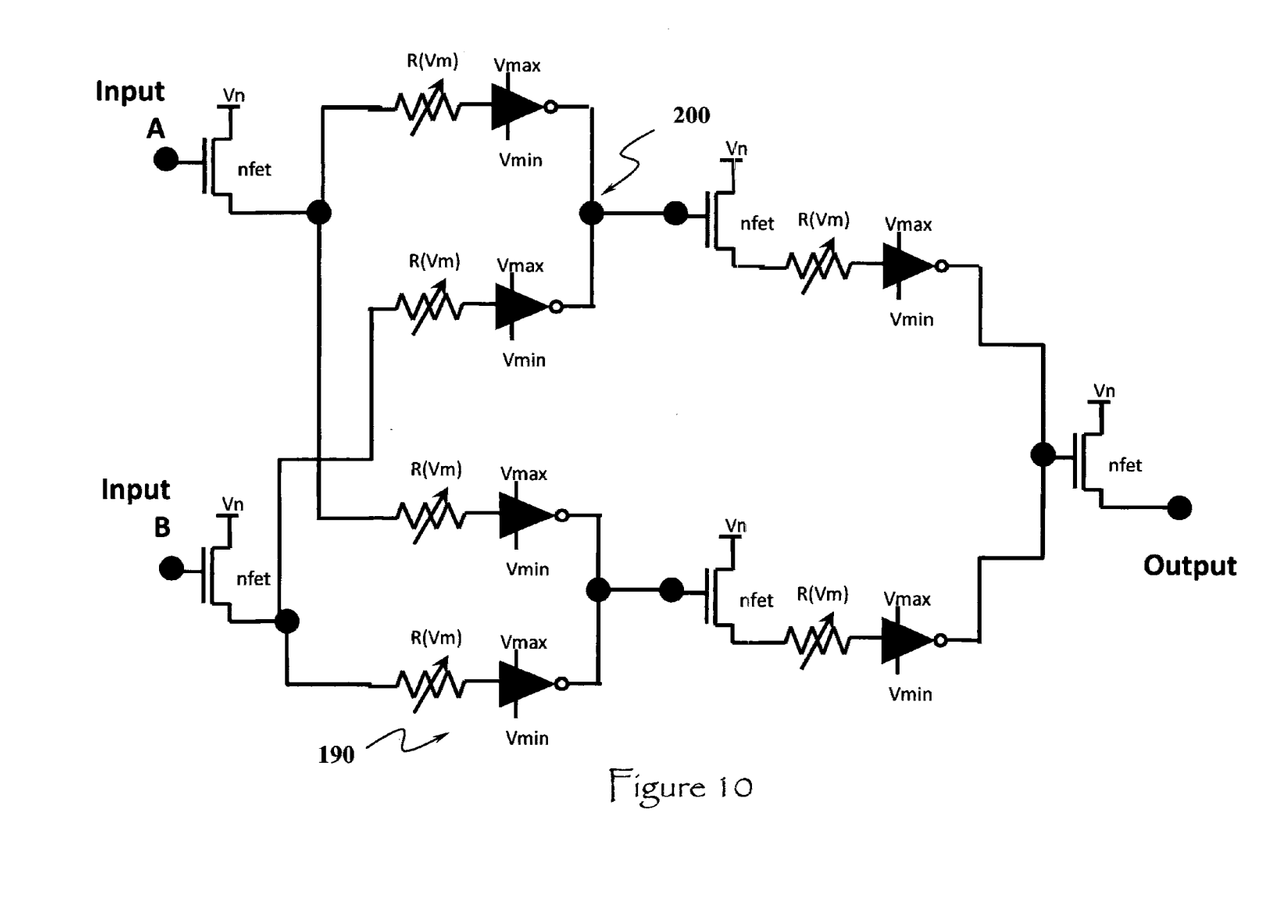
FIG. 10 depicts a neuromorphic computing architecture implementation employing thresholding neurons.

Referring to FIG. 9 depicts an example of a neuromorphic architecture implementation with floating adding neurons. Successive layers of synapse circuits are functionally depicted as being arranged horizontally, from left to right. The number of synapse circuits in each successive layer decreases by a factor of two owing to the effect of floating adding neurons. Computer simulations based on the physical principles described above demonstrate the feasibility of the neuromorphic architectures described herein. One skilled in the art would appreciate that variations of neuromorphic architectures can be constructed employing transistors, memristors, and inverter circuits coupled to floating node neurons or thresholding neurons to perform computations as described previously. FIG. 10 depicts another example of a neuromorphic implementation that demonstrates how a computing architecture can be implemented with floating node and thresholding neurons.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A neuromorphic computing device, comprising:
   at least one input;
   at least one output; and
   a plurality of synapse circuits electrically interconnecting said at least one input to said at least one output, wherein;
   said synapse circuit further comprises
      an input;
      an output; and
      a variable resistance element having an input and an output, wherein said variable resistance element controls the connection strength between said synapse circuits; and wherein
      said variable resistance element further comprises a transistor biased in its linear operating region, wherein said output of said synapse circuit outputs a signal SO(SI, Vm) according to the relationship $$O(SI, V_m) = -4 * \left[\mu_n C_{ox} \frac{W}{L}\left((V_m - V_{th})SI - \frac{SI}{2}\right)^2 R\right] + 2V$$

wherein
   SI is the input to said synapse in voltage units;
   $V_m$ is a biasing weight voltage of said transistor;
   W is the width of said gate of said transistor;
   L is the length of said gate of said transistor;
   $C_{ox}$ is the gate oxide capacitance of said transistor;
   R is the value of a biasing resistor used to control the potential output of said synapse;
   $V_{th}$ is the threshold voltage of said transistor; and
   $\mu_n$ is electron mobility of said transistor.

* * * * *